Figure 1:
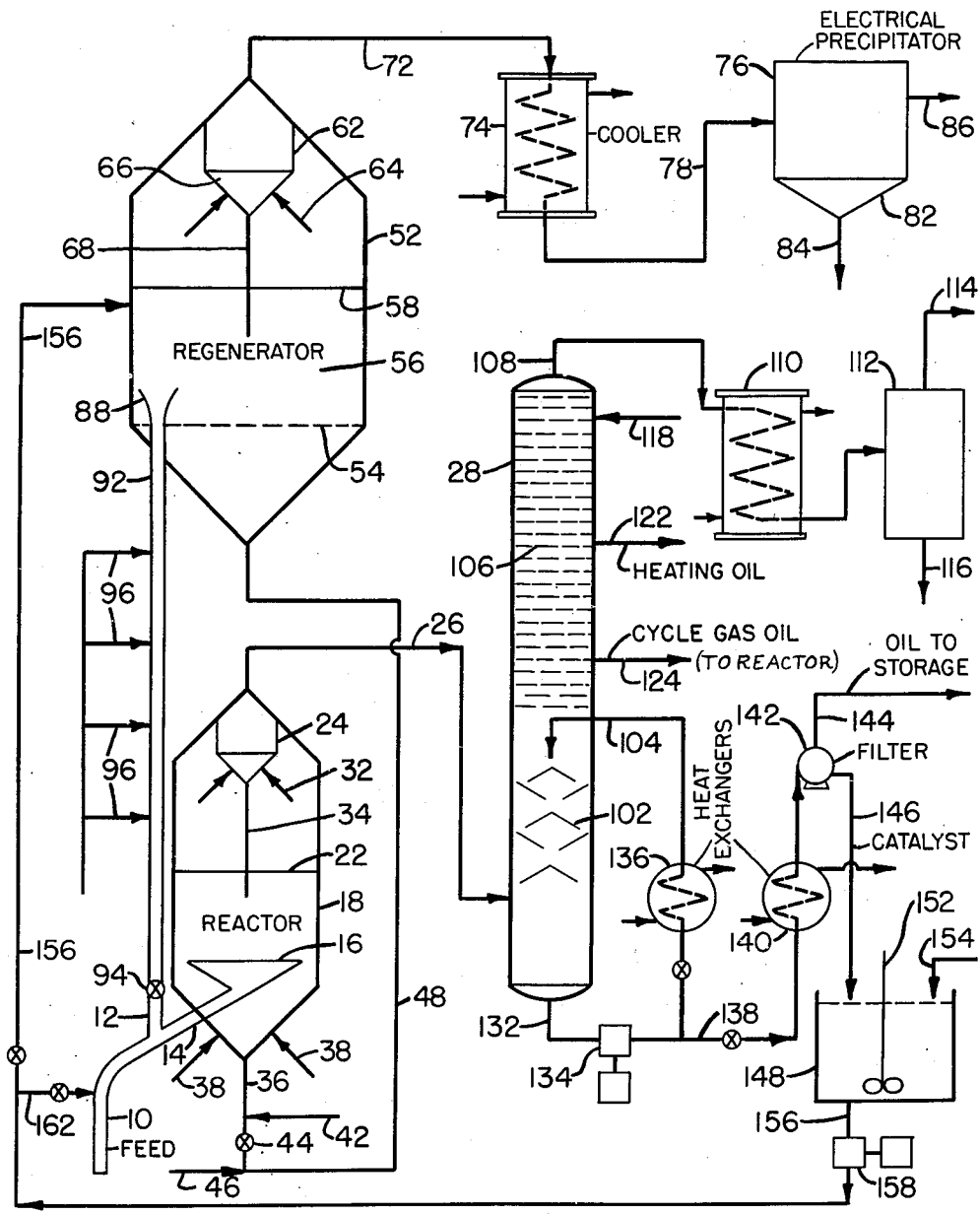

Patented Aug. 17, 1948

2,447,149

UNITED STATES PATENT OFFICE 2,447,149

CATALYTIC CONVERSION OF HYDROCARBONS

Lloyd D. Wier, East Baton Rouge, La., assignor to Standard Oil Development Company, a corporation of Delaware Application March 21, 1944, Serial No. 527,408

9 Claims. (Cl. 196—52)

This invention relates to catalytic reactions, and more particularly, relates to the catalytic conversion of hydrocarbons.

In catalytic conversion processes using catalyst particles, such as powdered catalyst, granular catalyst, or other divided catalyst particles, some of the catalyst in finely divided form is carried to the fractionator with the vaporous reaction products by entrainment and is recovered in the bottoms from the fractionator. In some instances, the bottoms from the fractionator with the recovered catalyst have been returned to the reactor but the bottoms form a poor cracking stock and form additional coke or carbonaceous deposits on the catalyst particles. If the bottoms are not returned to the reactor, the catalyst is lost.

In powdered catalyst processes where large amounts of catalyst are used, most of the catalyst is removed in dry form from the vaporous reaction products by separating means such as a cyclone separator or the like. In some cases most of the catalyst is removed in the reactor. The catalyst particles entrained in the vaporous reaction products, after the separation step, are recovered in the bottoms in the fractionator.

According to this invention, the bottoms from the fractionator containing catalyst particles as a slurry are passed to a suitable separating means to separate catalyst from the bottoms oil. Such separating means may be a filter, a centrifuge, a Dorr thickener, or the like. The separated oil is passed to storage and is not returned to the reactor. When a filter is used, the recovered catalyst is returned to the reactor or regenerator. The recovered catalyst is preferably mixed with feed oil to form a slurry which is preferably returned to the reactor. Or water may be mixed with the recovered catalyst particles and the water slurry passed to the regenerator.

When a Dorr thickener is used, the thick slurry or sludge on the bottom of the thickener is pumped to the reactor or regenerator, preferably the reactor.

Figure 2:
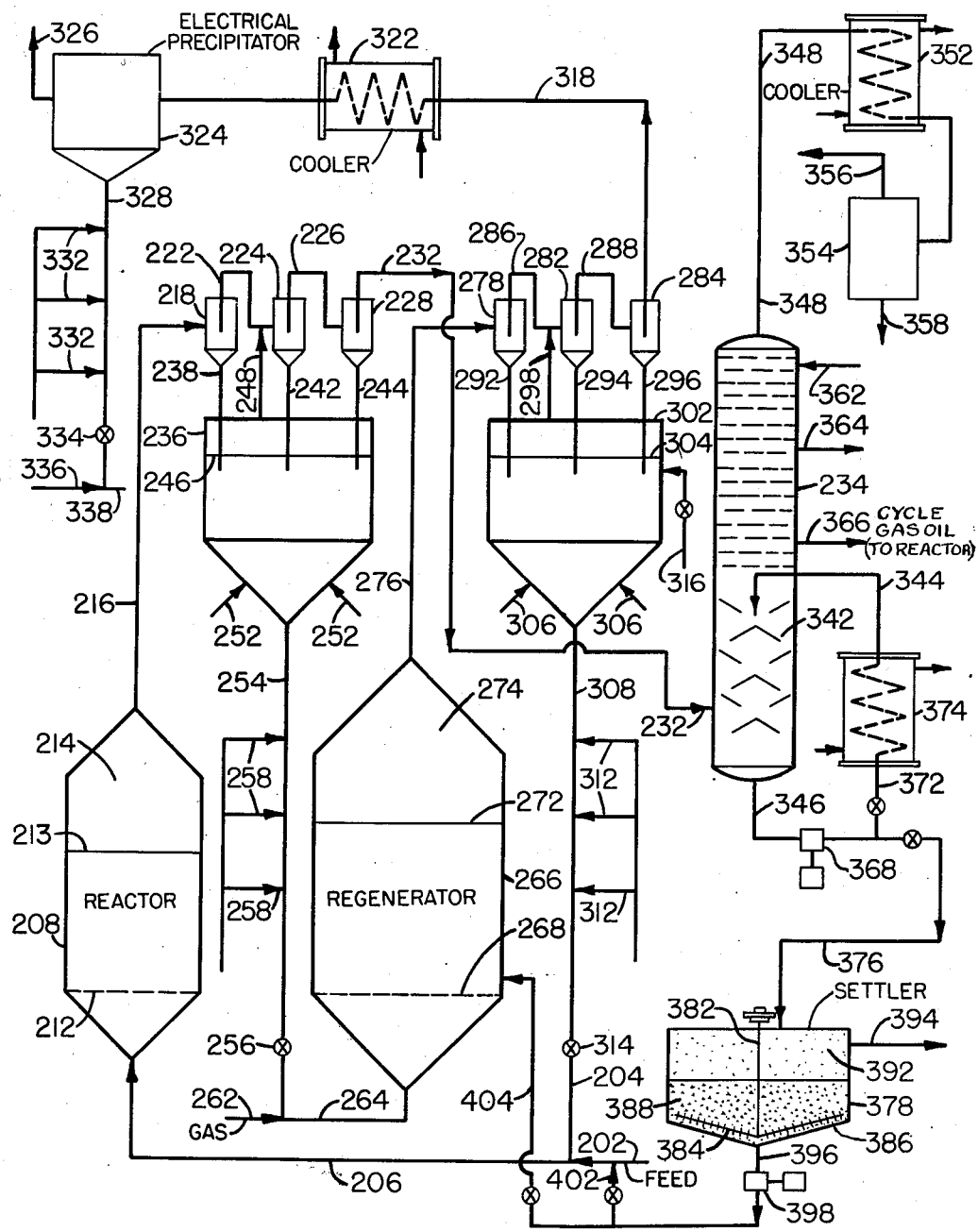

In the drawings,

Fig. 1 represents one form of apparatus using powdered catalyst in which catalyst is removed from the fractionator bottoms by means of a filter; and Fig. 2 represents another form of apparatus using powdered catalyst in which the catalyst is recovered from the fractionator bottoms by means of a Dorr thickener.

Referring now to the drawings, the reference character 10 designates a line through which liquid or vaporous reactant is passed. The reactant in a hydrocarbon conversion process may be reduced crude, gas oil, heavy naphtha, or other hydrocarbon oil. The hydrocarbon oil may be in vapor form or it may be only partly preheated and partly in vapor form and partly in liquid form. The rest of the heat necessary to vaporize any liquid oil and to raise the oil to cracking or conversion temperature is supplied by powdered catalyst.

Hot powdered catalyst is introduced into line 10 from line 12 in sufficient amount to effect the desired extent of conversion. In catalytic cracking the catalyst may be acid-treated bentonite clay or synthetically prepared silica-alumina gels, silica gels having magnesia incorporated therein, or other synthetic catalysts. The mixture of reactant and powdered catalyst is passed through line 14 and through distributor plate 16 arranged in a reaction vessel 18. The catalyst is preferably in powdered form having a size of about 200 to 400 mesh or finer but coarser catalyst may be used, if desired. When cracking gas oil and when using synthetic silica-alumina gels, a temperature of about 800° F. to 1100° F. is used and about 3 parts of catalyst to 30 parts of catalyst to 1 part of gas oil by weight are used. The weight of oil per hour per weight of catalyst in the reactor may vary between about 0.5 and 5.0.

The velocity of the vapors passing upwardly through the reaction vessel 18 are so selected that the catalyst particles become fluidized and the fluidized mixture has a level 22 similar to that of a liquid. When using acid-treated bentonite clay in powdered form, the dense mixture has a density of about 10 lbs./cu. ft. to 30 lbs./cu. ft. in the reaction vessel 18. Above the level 22 the suspension is relatively light and the vapors or reaction products only contain a small amount of entrained catalyst particles.

The reaction products in vapor form pass upwardly into the separating means 24 arranged in the upper part of the reaction vessel 18. The separating means 24 may be a cyclone separator, Multiclone separator, or the like. The reaction products in vapor form still containing some catalyst particles pass overhead through line 26 and into the bottom of fractionating tower 28 which will be further described hereinafter.

The separated catalyst particles in the separating means 24 are fluidized by the introduction of a fluidizing gas at 32 and the fluidized catalyst particles are returned to the fluidized mixture in the reaction vessel 18 through line 34 which dips below the level 22 of the catalyst particles therein.

During the conversion operation the catalyst particles become fouled with carbonaceous deposits or coke. The catalyst particles are withdrawn from the bottom of the reaction vessel through standpipe 36. The bottom of the reaction vessel is provided with gas inlet lines 38 for introducing a stripping gas into the spent catalyst before it is withdrawn from the reaction vessel 18. The stripping gas also serves to maintain the spent catalyst particles in fluidized condition. The spent catalyst particles flow into the standpipe 36 in which they are maintained in a fluidized condition by the introduction of fluidizing gas through line or lines 42.

The reaction vessel 18 above the dense mixture is maintained under a slight superatmospheric pressure to enable the vaporous reaction products to be passed through the fractionating equipment and associated parts. This pressure plus the pressure developed by the standpipe 36 and the column of relatively dense catalyst in the reaction vessel 18 is sufficient to raise a less dense mixture of the spent catalyst to the regenerator as will be presently described.

The standpipe 36 is provided with a control valve 44 for controlling the amount of catalyst withdrawn from the reaction vessel 18. A regenerating gas, such as air, or other oxygen-containing gas, is passed through line 46 and mixed with the spent catalyst below the valve 44 to form a less dense mixture of catalyst and air, and this less dense mixture is passed through line 48 into the bottom portion of a regeneration vessel 52. The regeneration vessel 52 is provided with a distribution plate or grid 54 in its lower portion through which the suspension is passed to distribute the regenerating gas and catalyst particles over the area of the regeneration vessel 52.

The velocity of the regenerating gas is so selected that the powdered catalyst undergoing regeneration is maintained in a relatively dense fluidized condition. The catalyst in the dense mixture is shown at 56 having a level at 58. In this condition the powdered catalyst assumes many of the characteristics of a liquid. The density of the dense fluidized catalyst is about 10 lbs./cu. ft. to 30 lbs./cu. ft.

The catalyst being regenerated is maintained in the regeneration zone for a sufficient time to effect the desired extent of regeneration. Substantially all of the coke or carbonaceous material is removed from the catalyst particles. The regeneration gases pass upwardly through the dense mixture in the regeneration vessel 52 and into the space above the level 58 to form a disperse phase in which the amount of catalyst suspended in the gases is relatively small. The temperature during regeneration is maintained between about 1000° F. and 1200° F.

The regeneration gases containing entrained catalyst particles are passed through a separating means 62 which is arranged in the upper portion of the regeneration vessel 52. The separating means 62 may be a cyclone separator, a Multiclone separator, or any other suitable gas-solid separating device. The separated solid particles are fluidized by the introduction of fluidizing gas at 64 into the hopper 66 of the separating means 62 and the solid particles in fluidized condition are returned to the relatively dense mixture of catalyst in the regeneration zone 52 through line 68 which extends below the level 58 of powdered catalyst or solid material in the regeneration zone 52.

Regeneration gases containing entrained solid particles leaves the top of the regeneration zone 52 through line 72 and are passed through a heat exchanger 74 before being passed to an electrical precipitator 76. The heat exchanger 74 may be a waste heat boiler or any other form of heat exchanger. The regeneration gases at a lower temperature are passed through line 78 to the electrical precipitator 76 in which there is an additional separation of powdered material. The powdered material is collected in a hopper 82 and passed to a standpipe 84 from which it can be returned to the regeneration vessel 52 or to the reaction vessel 18 in any desired manner. The regeneration gases substantially free of powdered material are passed to the atmosphere through line 86.

Returning now to the regeneration vessel 52, it will be noted that the regeneration vessel is placed at a higher level than the reaction vessel 18. Regenerated catalyst in fluidized condition is withdrawn from the body of catalyst undergoing regeneration shown at 56 through a funnel-shaped member 88 which extends above the distribution plate 54. From the funnel-shaped member 88 the fluidized catalyst flows into a standpipe 92 having a control valve 94 at its lower end. The control valve 94 controls the amount of catalyst being passed to line 12 for admixture with the reactant passing through line 10 as above described.

The hot regenerated catalyst in the standpipe 92 is maintained in a fluidized condition by the introduction of a fluidizing gas, such as air, through lines 96 which are spaced along the length of the standpipe 92. The standpipe 92 forms a column of fluidized solids producing a hydrostatic pressure at its lower end and this pressure plus the head of fluidized material 56 in the regeneration zone 52 is sufficient to return the regenerated catalyst to the reaction vessel 18.

Returning now to the fractionating tower 28, the vaporous reaction products containing entrained catalyst are passed through line 26 into the scrubbing section 102 in the bottom of the fractionating tower 28. The vaporous reaction products are cooled and heavier constituents are condensed therefrom. In addition, a scrubbing oil is introduced into the upper part of the scrubbing section through line 104. In a hydrocarbon cracking process the temperature of the scrubbing section is about 550° F. to 650° F. The vapors enter at about 900–975° F. The vapors are cooled to the scrubbing temperature by the scrubbing oil. All of the entrained powdered catalyst is scrubbed out of the vapors in the scrubbing section 102.

The uncondensed vapors are passed upwardly through the fractionating section 106 of the fractionating tower 28 and desired products are separated. The lightest vapors pass overhead through line 108 and cooler 110 to condense normally liquid hydrocarbons. The cooled and condensed material is passed to a separator 112 for separating liquid from gases. The gases pass overhead through line 114 and the liquids, which in this case contain gasoline constituents, are withdrawn through line 116.

If desired, a portion of the liquid passing through line 116 may be returned to the upper part of the fractionating section 106 through line 118 as reflux or other refluxing liquid may be introduced through line 118. Further down the fractionation tower a side stream is withdrawn through line 122 which comprises a heating oil. Further down the fractionating tower another side stream is withdrawn through line 124 and this side stream comprises cycle gas oil which may be recycled to the reaction vessel 18. Higher boiling constituents from the fractionating system 106 flow down into the scrubbing section 102.

The bottoms in the scrubbing section 102 contain the recovered catalyst in a slurry and this slurry is withdrawn through line 132 from the bottom of the scrubbing section. This oil from the bottom of the scrubbing section contains highly refractory stock which is not suitable as cracking stock. If this stock is returned to the reaction vessel 18, it results in an increased deposition of coke or carbonaceous material on the catalyst particles without the production of a large amount of gasoline. Therefore it is not desirable to recycle this heavy refractory oil to the reaction vessel 18 but it is desirable to recover the catalyst which is suspended in the bottoms oil.

A portion of the bottoms oil containing catalyst is passed through line 132 by pump 134 and through heat exchanger 136 for return through line 104 as the scrubbing oil for the scrubbing section 102 in the fractionating tower 28. The heat exchanger 136 may be a waste heat boiler or any other suitable heat exchanger. This cool oil acts to cool the reaction vapors introduced through line 26 and to condense heavier constituents from the reaction products and also functions to increase the concentration of catalyst particles suspended in the bottoms oil by recycling. When the desired concentration of catalyst is obtained in the bottoms oil, at least part of the oil is passed through line 138 at a temperature of about 600–650° F. and heat exchanger 140 and then to a filter 142 for separating catalyst particles from oil. In the heat exchanger 140 the temperature of the oil slurry is reduced to about 350° F. The filter is preferably operated continuously. The concentration of catalyst in the oil in line 138 is about 0.5 lbs. per gallon to 2.0 lbs. per gallon.

The filter 142 may comprise any suitable filter, such as a vacuum filter or a filter press, or the like. Preferably a continuous filter, such as a rotary filter, is used. With a rotary filter the drum is precoated with fresh catalyst and the filtered catalyst is washed while it is on the drum. Or a Sweetland filter may be used. The separated oil is passed through line 144 to storage and the recovered catalyst particles are withdrawn through line 146.

The separated catalyst may be picked up in a gas stream and returned to the reaction vessel 18 or the regeneration vessel 52. Preferably the recovered catalyst is introduced into a mixing vessel 148 provided with a stirrer 152 and oil feed is introduced into the vessel 148 through line 154 to dilute the catalyst slurry. If desired, a portion of the oil from line 144 may be used alone or added to the fresh feed passing through line 154. A slurry of catalyst and oil is produced in the container or vessel 148 which is withdrawn from the bottom through line 156 and passed through this line by pump 158. The oil slurry is preferably passed to the regeneration zone 52 into the body of catalyst 56 or it may be passed through line 162 into the feed line 10 for introduction into the reaction vessel 18.

Instead of using a filter for separating the catalyst from the bottoms taken from the fractionator 28, other separating means may be used, such as a centrifuge, a Dorr thickener, etc. If desired, the oil bottoms may be mixed with a relatively light hydrocarbon oil, such as naphtha or light gas oil, to remove tarry deposits from the catalyst particles and to facilitate removal of the particles from the oil bottoms.

The form of the invention shown in Fig. 2 will now be described. In Fig. 2 the reaction and regeneration vessels are of a slightly different construction in that the vapors or gases and catalyst particles pass overhead with these vapors rather than having the catalyst particles drawn off from the bottom of the vessels as a dense phase. Also, in Fig. 2 there is shown a Dorr thickener for separating catalyst from oil bottoms withdrawn from the bottom of the fractionator.

The reactants are passed through line 202 and mixed with catalyst particles from line 204 and the mixture is passed through line 206 to the bottom of the reaction vessel 208. The reaction vessel 208 has a bottom distribution plate 212 through which the mixture is passed and distributed across the area of the reaction vessel. In the conversion of hydrocarbon oils, partly preheated hydrocarbon liquids or heated hydrocarbon vapors are passed through line 202. If partly heated liquids are used, a sufficiently large amount of hot catalyst particles is used to vaporize the liquid reactants and raise them to the conversion temperature desired. When catalytically cracking a relatively heavy hydrocarbon oil, such as gas oil, and when using a catalyst, such as acid-treated bentonite or synthetic silica-alumina gels or the like, about 2 parts of catalyst to one of oil by weight to 20 parts of catalyst to one of oil may be used, and the temperature during cracking is about 800° F. to 1100° F. Preferably the catalyst particles have a size between about 200 and 400 standard mesh or finer. The weight of oil per hour per weight of catalyst in the reaction vessel may vary between about 0.5 and 5.0.

The velocity of the reactants in gaseous form passing through the reaction vessel 208 is controlled to obtain some settling of the particles in the reaction vessel 208 with respect to the reactants but complete settling out is avoided. The catalyst particles become fluidized and the mixture is relatively dense having a density of about 10 lbs./cu. ft. to 25 lbs./cu. ft. when using powdered acid-treated bentonite as the catalyst. The fluidized particles assume a level 213 similar to that of a liquid.

Above the dense phase there is a light phase 214 which is a relatively light suspension of catalyst particles in a gaseous fluid. In this form of the invention all of the vaporous or gaseous reaction products pass overhead from the reaction vessel 208 and all of the catalyst passes overhead with the reaction vapors or gases. The mixture of vapors or gases and powdered catalyst leaves the top of the reaction vessel 208 through line 216 and is preferably passed through separating means to separate the bulk of the catalyst particles from the reaction vapors or gases.

As shown in the drawing, three cyclone separators are used but other separating means may be used, if desired. The mixture passes into the first separator 218 in which a large part of the entrained catalyst particles is separated. The gases or vapors then pass through line 222 to a second cyclone separator 224 in which there is an additional separation of catalyst particles from gases or vapors. The gases or vapors then pass through line 226 into a third cyclone separator 228 to separate additional catalyst particles from vapors or gases.

The separated vapors or gases still contain some entrained catalyst particles and these gases or vapors are passed through line 232 into a fractionating tower 234 as will be hereinafter described in greater detail. The catalyst particles separated in the cyclone separators are passed to a hopper 236. Cyclone separators 218, 224 and 228 are provided respectively with dip pipes 238, 242 and 244 for returning the separated catalyst particles to the hopper 236 and below the level 246 of catalyst particles therein. Line 248 is provided in the top of the hopper 236 for removing gases or vapors from the hopper 236 and for leading them to the outlet line 222 from the first cyclone separator. Aerating lines 252 are provided at the bottom of the hopper 236 for introducing fluidizing or aerating gas to maintain the catalyst particles in the hopper in a dry fluidized condition.

The fluidized spent catalyst particles flow into a standpipe 254 provided with a control valve 256 at its lower end. Preferably aerating gas is introduced through lines 258 at spaced intervals along the length of the standpipe 254 to maintain the catalyst particles in a fluidized condition so that a column of fluidized particles is provided which produces a hydrostatic pressure at its lower end. The standpipe 254 is of sufficient height to produce a sufficient hydrostatic pressure for moving the catalyst particles through the regeneration system presently to be described.

Regenerating gas, such as air or oxygen-containing gas, is passed through line 262 and is mixed with spent catalyst particles passing through the control valve 256 from the standpipe 254. The mixture is passed through line 264 and into the bottom of the regeneration vessel 266 below distribution plate 268 therein. The velocity of the regenerating gas in the regeneration vessel 266 is so controlled that the catalyst undergoing regeneration is maintained in a dry fluidized condition and has a level indicated at 272.

When using acid-treated bentonite clay, the density of the mixture in the regeneration zone or vessel is about 10 lbs./cu. ft. to 25 lbs./cu. ft. The catalyst particles are maintained in the regeneration vessel 266 for a time sufficient to substantially completely burn off fouling material from the catalyst particles. In a catalytic cracking operation coke or carbonaceous material is deposited on the catalyst particles during the cracking operation and this coke or carbonaceous material is burned from the catalyst particles during regeneration.

It is necessary to control the temperature during regeneration to prevent overheating of the catalyst particles. This may be done by providing a heat exchanger (not shown) in the regeneration vessel 266 or part of the catalyst particles being regenerated may be removed from the regeneration vessel, cooled and returned to the regeneration vessel 266. The temperature during regeneration is about 1000° F. to 1200° F.

Above the dense phase 272 in the regeneration vessel 266 is a less dense or light phase 274 which comprises a light suspension of catalyst particles in regeneration gases. In this form of the invention the regenerated catalyst particles and the regeneration gases all go overhead from the regeneration vessel 266 through line 276 to separating means which comprises a series of cyclone separators. These cyclone separators function to remove most of the regenerated catalyst particles from the regeneration gases. The system of cyclone separators is similar to that shown in connection with the reaction vessel 208 and will be only briefly described. Cyclone separators 278, 282 and 284 are provided in series.

Line 286 connects the outlet of the first cyclone separator with the inlet of the second cyclone separator. Line 288 connects the second separator with the third cyclone separator. Dip pipes 292, 294 and 296 are provided respectively for cyclone separators 278, 282 and 284. A line 298 is provided for connecting the top of the hopper 302 with the outlet line 286 from the first cyclone separator 278. The dip pipes 292, 294 and 296 dip below the level 304 of catalyst particles in the hopper 302.

The regenerated catalyst particles in the hopper 302 are maintained in a fluidized condition by fluidizing gas introduced into the bottom of the hopper through lines 306. The fluidized regenerated catalyst particles at a temperature of about 1000°–1200° F. are introduced into standpipe 308 which is provided with fluidizing lines 312 along its length for introducing fluidizing gas to maintain the regenerated catalyst particles in fluidized condition in the standpipe.

In this way a column of fluidized particles is produced which exerts hydrostatic pressure at the base of the standpipe. The standpipe 308 is provided with a control valve 314 for controlling the amount of regenerated catalyst particles being introduced into line 204 above described. Fresh catalyst may be introduced through line 316 into hopper 302 to replace catalyst lost during the operation of the process.

The regeneration gases leave the last separator 284 through line 318 and still contain entrained catalyst particles. The regeneration gases are cooled by being passed through heat exchanger 322 which may be a waste heat boiler and the cooled gases are then passed to an electrical precipitator 324 for separating entrained catalyst particles from the regeneration gases.

The regeneration gases are vented to the atmosphere through line 326. The separated catalyst particles collect in the bottom of the precipitator 324 and are introduced into standpipe 328 provided with fluidizing lines 332 for introducing fluidizing gas into the standpipe 328 at spaced intervals. The catalyst particles recovered in the precipitator 324 are extremely fine and are difficult to fluidize. Preferably some of the coarser catalyst particles from the hopper 302 are introduced into the bottom of the electrical precipitator to produce a mixture of catalyst particles which is more easily fluidized.

The standpipe 328 is provided with a control valve 334 for controlling the rate of withdrawal of the catalyst from the standpipe 328. A carrier gas, such as air, is passed through line 336 and is mixed with the catalyst particles below control valve 334 and this mixture is passed through line 338 to any desired part of the system. Preferably the mixture in line 338 is introduced into the tertiary cyclone on the regenerator 284.

Returning now to the vaporous reaction products passing through line 232 to the fractionating tower 234, the vaporous reaction products are introduced into a scrubbing section 342 at the bottom of the fractionating tower 234. Scrubbing oil is introduced into the top of the scrubbing section through line 344. Heavier constituents are condensed from the reaction products and these, together with the scrubbing oil, scrub out residual catalyst particles from the vaporous reaction products. In the catalytic conversion of hydrocarbons, the higher boiling constituents will be relatively high boiling hydrocarbons. The relatively higher boiling hydrocarbons, together with catalyst, are withdrawn from the bottom of the scrubbing section 342 through line 346 and are further treated as will be presently described.

Uncondensed vapors and gases leave the top of the fractionating tower 234 through line 348 and are passed through a condenser 352 and then to a separating vessel 354 for separating liquids from gases. The gases pass overhead through line 356 and the liquid is withdrawn through line 358 from the bottom of the separating vessel 354. When cracking heavier hydrocarbons, the liquid withdrawn through line 358 comprises a light hydrocarbon liquid containing gasoline constituents. Reflux liquid is introduced into the top of the fractionating tower through line 362. Any suitable reflux liquid may be used from an extraneous source or a part of the liquid passing through line 358 may be returned to the top of the fractionating tower as reflux liquid.

A side stream comprising a higher boiling liquid may be withdrawn through line 364 from the fractionating tower 234. Another side stream may be withdrawn from the fractionating tower 234 through line 366 from a lower point in the fractionating tower. When cracking hydrocarbons, the liquid withdrawn through line 364 comprises a heating oil and the heavier fraction withdrawn through line 366 comprises cycle gas oil which may be returned to the reaction vessel 208 for further cracking.

The heavier oil or bottoms withdrawn through line 346 from the bottom of the scrubbing section 342 is pumped through the line by pump 368. In order to build up the concentration of the catalyst particles in the scrubbing section of the fractionating tower, at least part of the bottoms withdrawn from the scrubbing section 342 is passed through line 372 and cooler 374 and then returned to the top of the scrubbing section through line 344. When the desired concentration of catalyst particles in the bottoms is obtained, at least part of the bottoms is passed through line 376 to a Dorr thickener 378. The concentration of catalyst particles in the oil bottoms in line 376 in a catalytic conversion process is about 0.5-2.0 lbs./gallon. A heat exchanger may be provided in line 376 for controlling the temperature of the slurry going to the thickener 378.

The bottoms liquid is introduced into the central upper part of the Dorr thickener 378. A stirrer 382 is provided having rakes 384 at its lower end in the Dorr thickener 378. Preferably the bottom of the thickener is cone-shaped as shown at 386 to permit withdrawal of the heavy sludge from the bottom of the Dorr thickener.

The temperature of the oil bottoms in the Dorr thickener 378 is maintained between about 200° F. and 500° F. in order to obtain the best operation. The temperature selected varies with the viscosity of the oil. High enough temperatures are selected to give a sufficiently low viscosity so that rapid settling is obtained. The bottoms oil being introduced into the Dorr thickener should be about the same temperature as the oil in the thickener to avoid thermal currents being set up.

In the Dorr thickener the catalyst particles settle out and form a sludge 388 shown in the drawing by the darker shading in the Dorr thickener 378. The upper layer 392 is the clarified oil and the amount of catalyst particles in this oil should be maintained at below about 0.01 lb./gallon of oil. The clarified oil is withdrawn through line 394 and passed to storage but is not recycled to reaction vessel 208 because it is an extremely poor cracking stock. The clarified oil withdrawn through line 394 is about three-fourths of the oil sent to the Dorr thickener.

The heavy sludge of catalyst particles in the heavy oil has a concentration of about 1.5 lbs./gallon of oil to 6 lbs./gallon of oil. This sludge is withdrawn from the bottom of the Dorr thickener through line 396 and is passed through the line by pump 398. The heavy sludge may be returned through line 402 to the oil feed line 202 for return to the reaction vessel 208. Or the sludge may be passed through line 404 to the regeneration vessel 266 to regenerate the catalyst particles. Preferably the sludge is mixed with fresh feed before being passed to the reactor or regenerator to about one pound of catalyst to one gallon of oil so that the resulting oil will be easier to pump.

The heavy oil withdrawn from the bottom of the fractionator through line 346 is a poor cracking stock and it is preferably withdrawn from the system. However, it is desirable to recover the catalyst particles from the oil, and according to this invention, the catalyst particles are separated from the oil before being returned to the system. The oil is withdrawn through line 394 and may be passed to storage or otherwise disposed of.

If the heavy oil withdrawn from the bottom of the fractionating tower 234 through line 346 is returned to the reaction vessel 208, exceedingly large amounts of coke are laid down on the catalyst particles and large amounts of gas are produced without the production of much gasoline. The following data shows the improvement obtained by withdrawing the bottoms oil from the system rather than circulating it back to the reaction vessel:

In a commercial fluid catalyst cracking unit employing a synthetic silica-alumina gel type catalyst and operating at a feed rate of 12,000 barrels per day, a conversion of 65% of the feed to other products was obtained with a light paraffinic gas oil feed at a temperature of 975° F. In this operation 820 barrels per day of the slurry of catalyst and fractionator bottoms was recycled to the reactor. Under these conditions 5.5% of the gas oil feed was converted to coke which had to be removed from the catalyst by regeneration. When a slurry settler of the type described with reference to Fig. 2 was installed with fresh feed used to dilute the settled slurry for recycle to the reactor but with other conditions remaining unchanged, the conversion of fresh feed to coke was reduced to 4.5% on the feed.

In the form of the invention shown in Fig. 2, it is to be understood that instead of using a Dorr thickener, other separating means may be used, such as a filter, a centrifuge, such as a Laughlin centrifuge, or the like. The filtering arrangement shown in Fig. 1 may be used instead of the Dorr thickener shown in Fig. 2. If desired, a relatively light hydrocarbon oil, such as naptha or light gas oil, may be mixed with the oil slurry passing through line 376 or into the slurry in the Dorr thickener 378. The naphtha tends to dissolve tarry substances from the catalyst particles and also assists in settling of the catalyst particles. The naphtha may be recovered from the clarified oil passing through line 394 by distillation.

Instead of using only one Dorr thickener, two thickeners may be used in series with a washing step between the two thickeners. Fresh oil feed may be used as a wash oil or heavy cycle oil from line 366 in Fig. 2 may be used. Also the combination of a Dorr thickener with a filter or the combination of a Dorr thickener with a centrifuge may be used so that the bulk of the liquid is removed in the Dorr thickener before the slurry is passed to the filter or the centrifuge.

While the invention has been described in connection with the cracking of higher boiling hydrocarbons, it is to be understood that other hydrocarbon conversion operations are contemplated in which finely divided catalyst is used. Also, other chemical reactions involving the use of finely divided catalyst particles may be used. The invention may be used in catalytic reactions generally where solid catalyst is used in powdered or granular form, whether moving or stationary, where finely divided catalyst is entrained in vaporous or gaseous products leaving the reaction zone, but the invention is especially useful in hydrocarbon conversion processes where catalyst particles are collected in refractory oil.

While two forms of the invention have been shown and others have been described, it is to be understood that these are by way of example and various changes and modifications may be made without departing from the spirit of the invention.

What is claimed is:

1. In a process of converting hydrocarbons catalytically in a catalytic unit comprising a reaction zone and a regeneration zone wherein hydrocarbons are contacted with finely divided catalyst in a reaction zone and then most of the dry contaminated catalyst particles are separated from vaporous reaction products in a dry separation step and the separated particles are passed to said regeneration zone and the vaporous reaction products still contain entrained catalyst and low boiling and high boiling hydrocarbons, the steps of condensing only high boiling hydrocarbons from the vaporous reaction products in a scrubbing zone to scrub out catalyst particles and form a slurry, cooling a part of said slurry and recirculating the same to the scrubbing zone, separating catalyst particles contained in the remaining and uncooled part of the slurry from high boiling hydrocarbons, discarding the thereby separated high boiling hydrocarbons from the catalytic unit so as to avoid their further contact with catalyst particles and reaction products and returning the separated catalyst particles to the catalytic unit for reuse in the process, and fractionating the vapors remaining after condensation of the high boiling hydrocarbons to separate cycle oil from gasoline constituents.

2. In a process of converting hydrocarbons catalytically in a catalytic unit comprising a reaction zone and a regeneration zone wherein hydrocarbons are contacted with finely divided catalyst in a reaction zone and then most of the dry contaminated catalyst particles are separated from vaporous reaction products in a dry separation step and the separated particles are passed as a separate stream to a regeneration zone and the vaporous reaction products still contain entrained catalyst and low boiling and high boiling hydrocarbons, the steps of condensing only high boiling hydrocarbons from the vaporous reaction products in a scrubbing zone to scrub out catalyst particles and form a slurry, cooling a part of said slurry and recirculating the same to the scrubbing zone, separating by filtration catalyst particles contained in the remaining and uncooled part of the slurry from high boiling hydrocarbons, discarding the thereby separated high boiling hydrocarbons from the catalytic unit so as to avoid their further contact with catalyst particles and reaction products and returning the separated catalyst particles to the catalytic unit for reuse in the process, fractionating the vapors remaining after condensation of the high boiling hydrocarbons to separate cycle oil from gasoline constituents, and recycling the said cycle oil to said reaction zone.

3. A process of recovering entrained catalyst particles from vaporous hydrocarbon reaction products containing higher boiling refractory hydrocarbons unsuited for further treatment, comprising the successive steps of removing the major portion of the entrained catalyst by a dry separation means, then removing substantially the remainder of the entrained catalyst as a slurry in the higher boiling refractory hydrocarbons, then treating a portion of the slurry to segregate the catalyst contained therein from said refractory hydrocarbons and discarding at least a part of the segregated refractory hydrocarbons whereby their further contact with catalyst particles and reaction products is avoided, returning the segregated catalyst for further use in the reaction, cooling the remaining portion of said slurry and using the same to aid in the removal of further quantities of entrained catalyst.

4. In a process of converting hydrocarbons catalytically in a catalytic unit comprising a reaction zone and a regeneration zone wherein hydrocarbons are contacted with finely divided catalyst in a reaction zone and then most of the dry contaminated catalyst particles are separated from vaporous reaction products in a dry separation step and the separated particles are passed to said regeneration zone and the vaporous reaction products still contain entrained catalyst and low boiling and high boiling hydrocarbons, the steps of condensing only high boiling hydrocarbons from the vaporous reaction products in a scrubbing zone to scrub out catalyst particles and form a slurry, cooling a part of said slurry and recirculating the same to the scrubbing zone, separating by filtration catalyst particles contained in the remaining and uncooled part of the slurry from high boiling hydrocarbons, discarding the thereby separated high boiling hydrocarbons from the catalytic unit so as to avoid their further contact with catalyst particles and reaction products and returning the separated catalyst particles to the catalytic unit for reuse in the process.

5. A process according to claim 1 wherein the catalyst is separated from the slurry by settling and the settled sludge is at least in part passed to a regeneration zone to regenerate the catalyst particles.

6. A process according to claim 3 wherein the catalyst is separated from the slurry by settling and the settled sludge is at least in part recycled to said reaction.

7. A process according to claim 3 wherein the catalyst is separated from the slurry in a settling zone and the temperature in said settling zone is maintained at about 200° F. to about 500° F.

8. A process of recovering entrained catalyst particles from vaporous hydrocarbon reaction products containing higher boiling refractory hydrocarbons unsuited for further treatment, comprising the successive steps of removing the major portion of the entrained catalyst in a dry separation step, then removing substantially the remainder of the entrained catalyst as a slurry in the higher boiling refractory hydrocarbons, then treating a portion of the slurry to settle the catalyst and to concentrate the catalyst in the slurry to separate catalyst from refractory hydrocarbons and discarding at least a part of the thus separated refractory hydrocarbons whereby their further contact with catalyst particles and reaction products is avoided, returning the concentrated catalyst slurry for further use in the reaction, cooling the remaining portion of said slurry and using the same to aid in the removal of further quantities of entrained catalyst.

9. In a process of converting hydrocarbons catalytically in a catalytic unit comprising a reaction zone and a regeneration zone wherein hydrocarbons are contacted with finely divided catalyst in a reaction zone and then most of the dry contained catalyst particles are separated from vaporous reaction products in a dry separation step and catalyst particles are passed to said regeneration zone and the vaporous reaction products still contain entrained catalyst and low boiling and high boiling hydrocarbons, the steps of condensing only high boiling hydrocarbons from the vaporous reaction products in a scrubbing zone to scrub out catalyst particles and form a slurry, cooling a part of said slurry and recirculating the same to the scrubbing zone, separating by settling catalyst particles contained in the remaining and uncooled part of the slurry from high boiling hydrocarbons to form a more concentrated catalyst slurry, discarding the thus separated high boiling hydrocarbons from the catalytic unit so as to avoid their further contact with catalyst particles and returning the thus separated catalyst particles to the catalytic unit for reuse in the process.

LLOYD D. WIER.

REFERENCES CITED

The following references are of record in the file of this patent:

UNITED STATES PATENTS

| Number | Name | Date |
|---|---|---|
| 1,799,858 | Miller | Apr. 7, 1931 |
| 1,884,587 | Darlington | Oct. 25, 1932 |
| 2,259,487 | Payne | Oct. 21, 1941 |
| 2,303,680 | Brueckmann | Dec. 1, 1942 |
| 2,322,070 | Stratford et al. | June 15, 1943 |
| 2,327,175 | Conn | Aug. 17, 1943 |
| 2,328,325 | Butikofer | Aug. 31, 1943 |
| 2,333,851 | Egloff | Nov. 9, 1943 |
| 2,345,753 | Kinneberg | Apr. 4, 1944 |